United States Patent [19]
Yamamoto et al.

[11] Patent Number: 4,762,392
[45] Date of Patent: Aug. 9, 1988

[54] PLASTIC OPTICAL FIBERS

[75] Inventors: Takashi Yamamoto, Saeki; Ryuji Murata, Ohtake; Yasuteru Tahara, Ohtake; Hiromu Terada, Ohtake; Kenichi Sakunaga, Ohtake, all of Japan

[73] Assignee: Mitsubishi Rayon Co., Ltd., Tokyo, Japan

[21] Appl. No.: 830,584

[22] PCT Filed: May 29, 1985

[86] PCT No.: PCT/JP85/00294
§ 371 Date: Jan. 28, 1986
§ 102(e) Date: Jan. 28, 1986

[87] PCT Pub. No.: WO85/05699
PCT Pub. Date: Dec. 19, 1985

[30] Foreign Application Priority Data

May 30, 1984 [JP] Japan .................................. 59-108599
Jul. 11, 1984 [JP] Japan .................................. 59-142121

[51] Int. Cl.⁴ .................... G02B 6/10; C08F 120/18; B05D 5/06; B32B 27/00
[52] U.S. Cl. ........................ 350/96.30; 350/96.34; 526/329.7; 427/163; 428/394; 428/391; 428/378
[58] Field of Search ............... 350/96.23, 96.29, 96.30, 350/96.33, 96.34; 428/394, 395, 392, 373, 391, 378; 427/163; 526/329.7; 264/1.5, 1.6

[56] References Cited

U.S. PATENT DOCUMENTS

| 3,930,103 | 12/1975 | Chimura et al. | 350/96.30 X |
|---|---|---|---|
| 3,980,390 | 9/1976 | Yamamoto et al. | 350/96.33 X |
| 3,993,834 | 11/1976 | Chimura et al. | 428/373 |
| 4,114,981 | 9/1978 | Ishida et al. | 350/96.33 |
| 4,138,194 | 2/1979 | Beasley et al. | 350/96.34 X |
| 4,147,407 | 4/1979 | Eichenbaum et al. | 350/96.34 |
| 4,381,269 | 4/1983 | Kaino et al. | 350/96.30 X |
| 4,482,205 | 11/1984 | Lagakos et al. | 350/96.34 |
| 4,505,543 | 3/1985 | Ueba et al. | 350/96.34 |
| 4,544,235 | 10/1985 | Nishida et al. | 350/96.34 |
| 4,547,040 | 10/1985 | Yamamoto et al. | 350/96.34 |
| 4,593,974 | 6/1986 | Yamamoto et al. | 350/96.34 |
| 4,642,265 | 2/1987 | Suzuki | 350/96.34 X |
| 4,681,400 | 7/1987 | Ueba et al. | 350/96.34 |
| 4,693,553 | 9/1987 | Sasaki et al. | 350/96.34 |

FOREIGN PATENT DOCUMENTS

| 58-69805 | 5/1983 | Japan | 350/96.30 |
|---|---|---|---|
| 60-247605 | 12/1985 | Japan | 350/96.34 |

Primary Examiner—William L. Sikes
Assistant Examiner—Brian M. Healy
Attorney, Agent, or Firm—Oblon, Fisher, Spivak, McClelland & Maier

[57] ABSTRACT

There is provided a plastic optical fiber capable of exhibiting good light transmitting characteristics even at high temperatures, which comprises a core layer, a cladding layer, and a protective layer as basic consititutional units, wherein the protective layer has a heat distortion temperature [HDT] of at least 120° C., a thickness of at least 10 μm, and a cross-sectional area of at least 0.07 times the sum of cross-sectional areas of the core and cladding layers. There is also provided such a plastic optical fiber good in high-temperature light transmitting characteristics, which comprises a core layer, a cladding layer, and a protective layer as basic constitutional units and has a plastic coating layer having a silane-crosslinked structure provided as an outer layer thereof, wherein the protective layer has a heat distortion temperature [HDT] of at least 120° C., a thickness of at least 10 μm, and a cross-sectional area of at least 0.07 times the sum of cross-sectional areas of the core and cladding layers.

33 Claims, 3 Drawing Sheets

PLASTIC OPTICAL FIBERS

TECHNICAL FIELD

The present invention relates to plastic optical fibers and more particularly to plastic optical fibers excellent in heat resistance.

BACKGROUND ART

Up to now there have been known optical fibers composed of inorganic glass which are superior in light transmitting properties over a wide range of wavelengths. These inorganic fibers, however, exhibit inferior processability, poor flexibility, and moreover they are expensive. Hence, optical fibers based on plastics have been developed. These plastic optical fibers are obtained by producing fibers having core-cladding structure wherein the core material is a polymer having a high refractive index and a high light transmittance and the cladding material is a polymer having a lower refractive index than that of the core material and being transparent. For useful polymers as core components having high light transmittance, amorphous materials are desirable and polymethyl methacrylate, polycarbonate, and polystyrene are generally used. Of these polymers, polymethyl methacrylate, superior in transparency and furthermore in mechanical properties and weather resistance, is used on an industrial scale as the core material of high-performance plastic optical fibers. However, the glass transition temperature (Tg) of polymethyl methacrylate is 100° C. and the use thereof has been limited in the aspect of heat resistance.

Moreover, various plastic optical fibers comprising polycarbonate as the core material have been proposed, but they are not put into practical use, since the light transmission loss through polycarbonate is large and no cladding material superior in heat resistance has been developed.

Therefore, it is proposed, for example, in Japanese Patent Application Laid-Open No. 18608/83, to enhance the heat resistance by forming a three- or more-layer structure wherein a protective layer or the like having the same composition as that of the core material is provided additionally around the cladding.

In spite of such structural improvement, a large amount of thermal shrinkage is citable as a drawback common to the conventional optical fibers of plastics. It is the present situation that improvement in this respect is insufficient. In consequence, their light transmission characteristics are markedly deteriorated on account of their thermal shrinkage, for instance, when they are used as optical communication means or photosensors which are set in high-temperature sites such as engine rooms of automobiles or of ships, so that they have the disadvantage of the application thereof being restricted.

In case of an optical fiber of three-layer structure as stated above, the action of depressing thermal shrinkage can be enhanced by reducing the core diameter and relatively thickening the protective layer. In this case, however, there is caused a problem that the core diameter needs to be extremely small, for example, about 100 μm, such fibers are difficult to connect one with another, and when the fiber is combined with a light emitting diode (LED), the light incidence efficiency will be lowered.

Under such circumstances, the present inventors have found that the prior art problems noted above can be solved by using a protective layer of high heat distortion temperature for an optical fiber of threelayer structure and optimizing the diameter or thickness proportions of the component layers. Thus the present invention has been accomplished.

DISCLOSURE OF THE INVENTION

It is an object of the invention to provide a plastic optical fiber which has a core layer of depressed thermal shrinkage and thereby is capable of exhibiting good light transmitting characteristics even at high temperatures.

The above object is achieved by a plastic optical fiber of the present invention, that is, plastic optical fiber comprising a core layer, a cladding layer, and a protective layer as basic constitutional units, wherein the protective layer has a heat distortion temperature of at least 120° C., a thickness of at least 10 μm, and a cross-sectional area of at least 0.07 time the sum of cross-sectional areas of the core and cladding layers.

The above object is also achieved by a plastic optical fiber which is another embodiment of the present invention, that is, a plastic optical fiber comprising a core layer, a cladding layer, and a protective layer as basic constitutional units and additionally a plastic coating layer as an outer layer thereof, which has a silane-cross-linked structure, wherein the protective layer has a heat distortion temperature (HDT) of at least 120° C., a thickness of at least 10 μm, and a cross-sectional area of at least 0.07 time the sum of cross-sectional areas of the core and cladding layers.

BEST MODE FOR CARRYING OUT THE INVENTION

Figure 1:
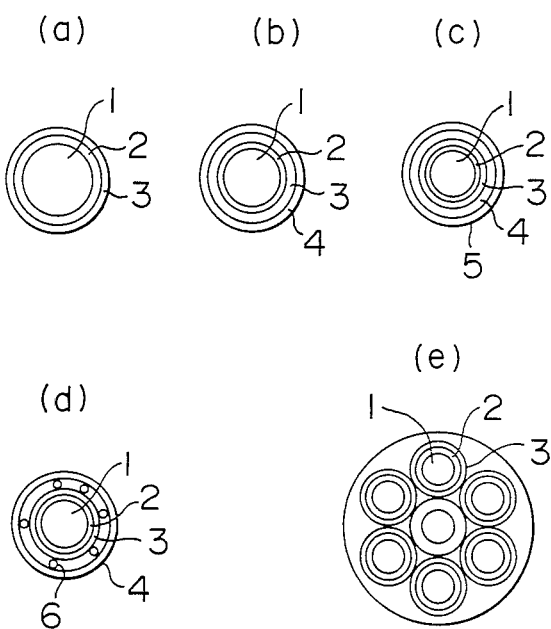
FIGS. 1(a)–1(e) are cross-sectional views of optical fibers of the present invention.

As to the structure of the plastic optical fiber of the invention, cross-sectional views thereof are shown as examples in FIG. 1. In these examples, each fiber comprises, in the order from the inside, core layer 1, cladding layer 2, and protective layer 3 as basic constitutional units and may be provided additionally with coating layers such as fourth layer 4, fifth layer 5 . . . , and moreover with tension members 6 made of polymer fibers, metallic wires or the like or with a film, a paper-like material or the like outside the protective layer 3 in accordance with the objective uses.

FIG. 1(a) shows an optical fiber of threelayer structure, FIG. 1(b) an optical fiber of fourlayer structure, FIG. 1(d) an optical fiber cable comprising an optical fiber of three-layer structure overlaid through tension members 6 with a coating layer as a fourth layer, and FIG. 1(e) a cable comprising optical fibers of three-layer structure.

The present invention is characterized in that in a plastic optical fiber, as shown in FIGS. 1(a)–1(e), comprising core layer 1, cladding layer 2, and protective layer 3 as basic constitutional units, the protective layer is comprised of a polymer having a heat distortion temperature of at least 120° C. and has a thickness of at least 10 μm and a cross-sectional area of at least 0.07 time the sum of cross-sectional areas of the core and cladding layers, whereby the thermal shrinkage of the fiber can be kept low without extreme decrease in the diameter of the core layer 1 and the fiber is enabled to exhibit good light transmitting characteristics even at high temperatures. When the cross-sectional area of the protective layer is less than 0.07 time the sum of cross-sectional areas of the core and cladding layers, the anti-shrinkage effect of the protective layer will not be achieved and no good light transmitting property at high temperatures will be attained.

The thickness of the protective layer needs to be at least 10 $\mu$m. With the thickness less than 10 $\mu$m, the heat resistance of the optical fiber will be inferior, and with the thickness of 1 mm or more, the diameter of the fiber will be too large, both the cases being undesirable. Preferably the thickness of the protective layer is 250 $\mu$m at the most.

The protective layer may have either a single layer structure or a multilayer structure.

As to the optical fiber having a multiprotective layer, it is desirable, for the purpose of dissolving structural disorder and giving mechanical properties to well withstand repeated bending actions, that the protective layer be constituted by both a primary coating formed from a material having a flexural elastic modulus $\epsilon_1$ (kg/cm$^2$) and a cross-sectional area $A_1$ (cm$^2$) and a secondary coating formed from a material having a flexural elastic modulus $\epsilon_2$ (kg/cm$^2$) and a cross-sectional area $A_2$ (cm$^2$) and these materials of the primary and secondary coatings be organic polymers satisfying $\epsilon_1 A_1 \leq \epsilon_2 A_2$.

Moreover, it becomes possible to fabricate a cable with a coating material having higher heat resistance at high temperatures by providing a plastics coating layer having a silane-crosslinked structure as an outer layer of the plastic optical fiber comprising a core layer, a cladding layer, and a protective layer as basic constitutional units.

The optical fiber of the present invention is desired to have the following thermal shrinkage characteristics:

(i) In 24 hours' dry heat treatment at 120° C., the shrinkage is up to 5% (more preferably up to 3%, and most preferably up to 1%).

Herein, the 24 hours' dry heat treatment at 120° C. means that the optical fiber to be treated is placed in an atmosphere (generally in the air, though there is no particular restriction on the kind and pressure of atmosphere-forming gas) substantially free of moisture and heat treated at 120° C. for 24 hours by using a suitable heating means. Also herein, the shrinkage means the amount of shrinkage caused in the fiber direction of the optical fiber by the heat treatment, said amount being expressed in percentage based on a unit length of the fiber before the heat treatment.

More desirable thermal shrinkage characteristics of the plastic optical fiber of the present invention are shown in the following (ii) to (iv). Herein, the thermal shrinkage characteristics described in from (ii) to (iv) show more desirable thermal shrinkage in the order.

(ii) In 24 hours' wet heat treatment under the conditions of 90° C. and 95% R.H., the shrinkage is up to 5% (more preferably up to 3%, most preferably up to 1%).

(iii) In 24 hours' dry heat treatment at 130° C., the shrinkage is up to 5% (more preferably up to 3%, most preferably up to 1%).

(iv) In 24 hours' wet heat treatment in boiling water at 100° C., the shrinkage is up to 5% (more preferably up to 3%, most preferably up to 1%).

The respective diameters or thicknesses of the core layer 1, cladding layer 2, and protective layer 3 can be arbitrarily chosen as far as the cross-sectional ratio defined above is secured. However, the diameter of the core layer is desirably 100 to 3,000 $\mu$m, preferably 250 to 1,500 $\mu$m, since too small diameters thereof are undesirable in the fiber connection and the light incidence efficiency from LED as stated before. In such a range of the core layer 1 diameter, it is also desirable that the cross-sectional area of the protective layer 3 be in the range of 0.07 to 100 times the sum of cross-sectional areas of the core layer 1 and the cladding layer 2. For practical use, about 1,000 $\mu$m (1 mm) is the most desirable outer diameter of the whole basic constitutional units forming the optical fiber of the present invention. In this case, it is particularly preferable to constitute the fiber so that the combined outer diameter of the core layer 1 and the cladding layer 2 may be about 500 $\mu$m, that is, the cross-sectional area of the protective layer may be about three times the sum of cross-sectional areas of the core and cladding layers.

An amorphous transparent polymer is appropriate as the polymer to be used for the core layer 1. Such a polymer includes, for example, a homopolymer or copolymer of methyl methacrylate (For the copolymer, it is desirable that at least 70% by weight of the starting monomers be methyl methacrylate and at most 30% by weight thereof be a monomer copolymerizable with methyl methacrylate, the monomer copolymerizable with methyl methacrylate being exemplified by vinyl monomers including methyl acrylate and ethyl acrylate.); copolymers of methacrylic esters such as cyclohexyl methacrylate, t-butyl methacrylate, norbornyl methacrylate, adamantyl methacrylate, benzyl methacrylate, phenyl methacrylate, and nephthyl methacrylate, with monomers copolymerizable with these; polycarbonate, polystyrene, styrene-methacrylic ester copolymers, and deuterium-substituted polymers resulting from the reaction of replacing all or some of the hydrogen atoms of the above polymers with deuterium. Of course, other transparent polymers and transparent polymer belends are applicable.

For the cladding layer 2, there is used a substantially transparent polymer having a refractive index lower by at least 0.01 than that of the core material. Usually, it is preferable to select the cladding material from such polymers that refractive index differences between the polymers and the core material are in the range of 0.01 to 0.15. There is no particular restriction on the kind of claddingforming polymer; known polymers of the prior art can be used for the cladding. For instance, when a homopolymer or copolymer of methyl methacrylate is used as the core material, there may be used polymers of esters made from methacrylic acid and fluorinated alcohols, as disclosed in Japanese Patent Publication Nos. 8978/68, 8321/81, 8322/81, and 8323/81 and Japanese Patent Application Laid-Open No. 60243/78 and others. When polycarbonate or polystyrene is used as the core material for example, polymethyl methacrylate can be used as the cladding material. Other examples of the cladding material include vinylidene fluoride polymers as described in, e.g., Japanese Patent Publication Nos. 8978/68 and 42260/78. Further, vinylidene fluoride-hexafluoropropylene copolymers and methacrylic ester polymers other than polymethyl methacrylate mentioned above, can also be used as the cladding material.

Furthermore, there may be used a homopolymer or copolymer comprising monomer units represented by the general formula:

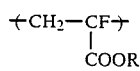  [I]

wherein R represents a $C_1$–$C_5$ alkyl, fluorinated $C_1$–$C_5$ alkyl, or $C_3$–$C_6$ cycloalkyl group, which are prepared from α-fluoroacrylic acid and either a fluorinated alkyl alcohol or an alkyl alcohol.

The polymer used for the protective layer 3 may be either transparent or opaque and either amorphous or crystalline but is desired to have a heat distortion temperature of at least 120° C. and be superior in antishrinkage property, in view of the object of the present invention. Desirable polymers herein actually belong to the class of the so-called engineering plastics including, for example, polycarbonate, poly-4-methylpentene-1, polyvinylidene fluoride, polypropylene, polyethylene terephthalate, polytetramethylene terephthalate, ABS resin, polyoxymethylene, polybutene, polysulfone, and polyamide.

Particularly preferred polymers for the protective layer are, for example, (1) a polycarbonate exhibiting a limiting viscosity (in methylene chloride at 20° C.) of 0.4 to 0.8 dl/g, (2) a polymer consisting mainly of 4-methylpentene-1 units, and (3) an ethylenic polymer having a waterproof property.

The polycarbonate used for the protective layer 3 is represented by the general formula,

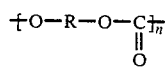

and exemplified by an alicyclic polycarbonate where R is represented by

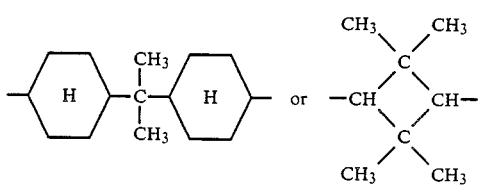

and an aromatic polycarbonate where R is represented by

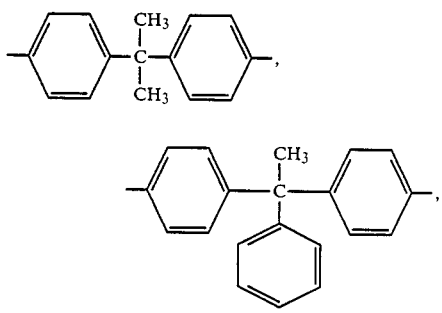

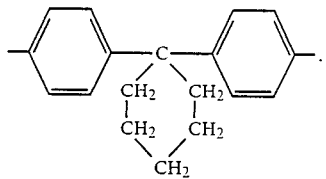

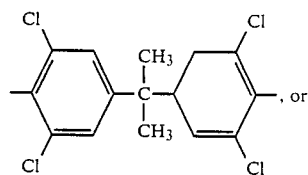

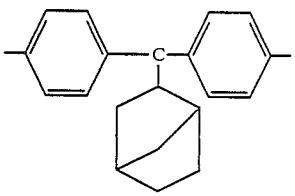

There may also be used copolymers of these monomers with dihydroxy compounds such as 4,4'-dihydroxydiphenyl ether, ethylene glycol, p-xylylene glycol, 1,6-hexanediol, and the like, but polymers having heat distortion temperatures of 120° C. and higher are desirable from the viewpoint of heat resistance.

Herein, the heat distortion temperature is the value measured under a load of 4.6 kg/cm² in accordance with ASTMD-648. It is desirable to select and use a polycarbonate having a limiting viscosity [η] (in methylene chloride at 20° C.) of 0.4 to 0.8 dl/g, as such a polycarbonate. When the [η] is less than 0.4 dl/g, the prior art drawbacks noted before will develop and no satisfactory characteristics will be obtained in respect to mechanical strength, thermal shrinkage, and heat resistance. When the [η] exceeds 0.8 dl/g, the shapeability will become worse and the practicality will fail. Polycarbonates of such high [η] values can be prepared according to the hitherto known polymerization processes, preferably in general according to the interfacial polycondensation process. A desired [η] value can be obtained by controlling polymerization conditions such as polymerization temperature and hydrogen ion concentration according to the ordinary method, and selecting and using a polymerization initiator, a chain transfer agent, etc., to control the degree of polymerization.

The polymer consisting mainly of 4-methylpentene-1 used for the protective layer 3 is light weight and superior in flexing resistance. There may be used a homopolymer of 4-methylpentene-1 or a copolymer containing 70% by weight or more of 4-methylpentene-1, for example, TPX supplied by Mitsui Petrochemical Co., Ltd.

When the protective layer is constituted by double coatings, the primary coating has a buffering action for preventing the strain which may develop at the core-cladding interface on account of the secondary coating layer. In the present invention, it is desirable that the flexural elastic modulus $\epsilon_1$ (kg/cm²) of primary coating material be equal to or less than the flexural elastic modulus $\epsilon_0$ (kg/cm²) of the core material.

As the primary coating material, it is possible to select and use organic polymers which satisfy $$10^2 \leq \epsilon_1,$$

preferably $$5 \times 10^2 \leq \epsilon_1 \leq 2 \times 10^4,$$

more preferably $$5 \times 10^2 \leq \epsilon_1 \leq 5 \times 10^3.$$

The cross-sectional area $A_1$ (cm$^2$) of this primary coating layer varies depending on the fiber core diameter; for instance, when the core diameter is 750 μm, $A_1$ is from $1 \times 10^{-1}$ to $1 \times 10^{-5}$ cm$^2$, preferably from $1 \times 10^{-2}$ to $1 \times 10^{-4}$ cm$^2$.

The secondary coating layer has the action of maintaining the strength of the optical fiber and preventing the core-cladding interface from the strain or deformation due to external force. In the present invention, it is desirable that the flexural elastic modulus $\epsilon_2$ (kg/cm$^2$) of the secondary coating material be equal to or higher than $\epsilon_1$. As the secondary coating material, it is possible to select and use organic polymers which satisfy preferably $$1 \times 10^2 \leq \epsilon_2 \leq 5 \times 10^4,$$

more preferably $$1 \times 10^2 \leq \epsilon_2 \leq 3 \times 10^4.$$

The cross-sectional area $A_2$ (cm$^2$) of this secondary coating layer varies depending on the fiber core diameter; for instance, when the core diameter is 750 μm, $A_2$ is from $1 \times 10^{-3}$ to 1 cm$^2$, preferably from $1 \times 10^{-3}$ to $1 \times 10^{-1}$ cm$^2$, more preferably from $1 \times 10^{-2}$ to $1 \times 10^{-1}$ cm$^2$.

Organic polymers available for these primary and secondary coating layers are highly elastic synthetic resins including, for example, urethane resin, silicone resin, polyethylene, polypropylene, ethylene-vinyl acetate copolymer resin, polyester elastomer, acrylic ester copolymer resin, and ionomer-nylon elastomer. In addition, these synthetic resins can be combined with polyamide, polyester, polycarbonate, poly-4-methylpentene-1, polyvinylidene fluoride, polyacetal, or the like.

The most important point in choosing the double coating materials is that the primary and secondary coating materials should satisfy the relation:

$$\epsilon_1 A_1 \leq \epsilon_2 A_2.$$

If this relation is not satisfied, the buffering action of the primary coating layer will be too weak to achieve the object of the present invention.

Moreover, in selecting the base materials for the primary and secondary coating layers of the present invention, it is desirable to choose materials of low thermal shrinkage for the purpose of improving light transmitting characteristics of the fiber, particularly to depress the light transmission loss when the optical fiber is used in a site of a high temperature, e.g., 100° C. or higher. The intended value of this thermal shrinkage is up to 10% at 100° C., preferably up to 10% at 115° C., more preferably up to 10% at 125° C.

An organic polymer satisfying such requirement in thermal shrinkage can be suitably selected from the above-cited organic polymers, e.g., silicone resin, high density polyethylene, polyamide, polyester, polycarbonate, poly-4-methylpentene-1, fluorinated polymers such as polyvinylidene fluoride, and polyacetal. In this case, it is desirable to choose polymers of low thermal shrinkage for both the primary and secondary coating layers. However, an organic polymer of low thermal shrinkage, even when used for either one of the primary and secondary coating layers, may exhibit its effect sufficiently depending on circumstances.

It is also possible to incorporate an inorganic or organic filler such as carbon black, talc, glass fibers, aromatic polyamide fibers, carbon fibers, or the like into the polymer to be used for the protective layer 3.

When a plastic coating layer having a silanecrosslinked structure is formed as the outer layer of the plastic optical fiber of the present invention, there is used for this layer a structure in which the silane crosslinkage structure is made of —Si—O—Si— and the plastics structure is made of an organic polymer selected from polyethylene, chlorinated polyethylene, ethylenepropylene copolymer, ethylene-vinyl acetate copolymer, ethylene-ethyl acrylate copolymer, and tetrafluoroethylenepropylene copolymer.

As the base material for the protective layer laid inside the plastic coating layer having a silanecrosslinked structure, it is desirable to use an organic polymer which is insoluble in the alcohols that will be produced by the water-crosslinking reaction and which is impermeable to alcohol and water and which does not undergo any chemical change to cause decomposition or deformation. Such organic polymers include, for example, polyolefins such as polyethylene, ethylenic copolymeric ionomers, polypropylene, and poly-4-methylpentene-1; halogen-containing polymers such as polyvinylidene fluoride, vinylidene fluoride copolymer, polytetrafluoroethylene, tetrafluoroethylene copolymer, polyvinyl chloride, and polyvinylidene chloride; and polyester, polyamide, polycarbonate, polyacetal, ABS resin, and SBR resin.

The process for producing the plastic optical fiber of the present invention can be exemplified by the following three processes which are different in methods for overlaying the core layer 1 with the cladding layer 2 and with the protective layer 3. One of the processes is the so-called composite spinning process which comprises discharging the respective materials for the core layer 1, cladding layer 2, and protective layer 3 while arranging these materials in molten states by using a special nozzle, and shaping them. Another one of the processes is a combination of said composite spinning process with a coating process, wherein the core layer 1 and cladding layer 2 are formed according to the composite sprinning process, then a solution of the protective layer 3 material in a suitable solvent is applied around the formed fiber, and the solvent is removed therefrom to give an optical fiber. The other process is a coating process which comprises forming first the core layer 1 material into a predetermined fiber, coating it with a solution of the cladding layer 2 material in a suitable solvent, followed by solvent removal, and coating the resulting layer with a solution of the protective layer 3 material in a suitable solvent, followed by solvent removal.

Comparing these three processes, the composite spinning process is a labor- and energy-saving process which has high productivity and permits simplifying the equipment. Further, this process has advantages such that optical fibers of a wide variety of diameters can be produced and process control is easy. Thus, this process is extremely favorable industrially and enables the production of high performance fibers at low costs.

Figure 2:
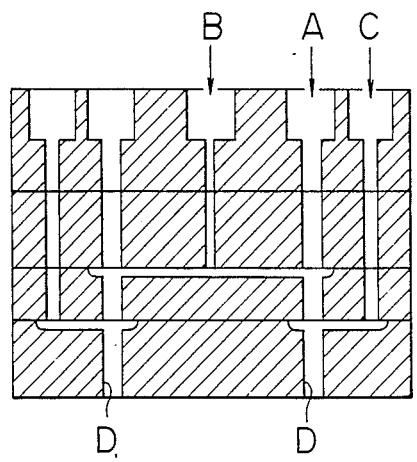
FIGS. 2 and 3 are cross-sectional views showing each an example of the structure of a spinneret for producing optical fibers of three-layer structure.
Figure 3:
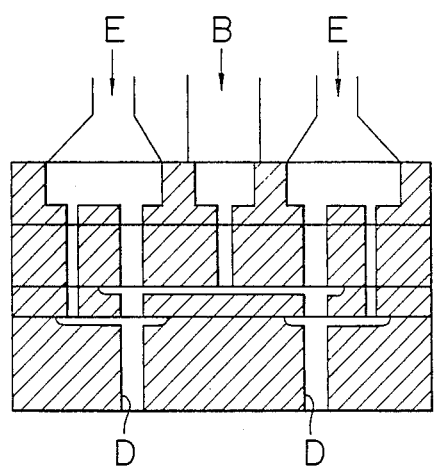

In case of the production according to the composite spinning process, there is used a composite spinning machine which comprises a core-material melt extruder, cladding-material melt extruder, and protectivematerial melt extruder. The core material is melted in its melt extruder and fed in a definite amount to a spinning head through a metering pump. Similarly, the cladding material and the protective material are fed separately to the spinning head. The three kinds of materials therein are formed through a spinneret, for example, as shown in FIG. 2, into a three-layer structure, which is discharged, cooled to solidify, wound up, and subjected, depending on circumstances, to stretch or annealing treatment. In FIG. 2, the core material, cladding material, and protective layer material are fed at A, B, and C, respectively, and discharged at D. When the core material and the protective layer material, for instance, are identical, they can be fed through one way to a spinning head and then distributed by using a spinneret as shown in FIG. 3. Herein, the core material and the protective layer material are fed at E, distributed through a spinneret, and jointly with the cladding material fed at B, are formed into a threelayer structure and discharged at D.

For the purpose of more improving the plastic optical fiber of the present invention in light transmitting properties and shrinkage resistance, it is very effective to carry out the melt extrusion at a high temperature in the composite spinning process. This melt extrusion temperature varies depending on the polymer forming the core layer. For example, when the core material is a homopolymer of methyl methacrylate, it is desirable to raise the melt extrusion temperature from the conventional level of 220°-240° C. to 240°-270° C. In cases of polycarbonate and polystyrene, the respective melt extrusion temperatures are desirably raised to 250°-290° C. and to 240°-270° C. Such elevation of the melt extrusion temperature not only improves the optical fiber in thermal shrinkage characteristics but also enables the fiber to experience a heat history of temperatures near to 200° C. during the fabrication of a cable from the fiber and hence permits the choice and use of a coating material having higher heat resistance, and thus exhibits the special effect of enlarging the latitude of coating material selection.

The diameter and thicknesses of the core layer 1, cladding layer 2, and protective layer 3 in the plastic optical fiber of the present invention, are properly predetermined according to the intended use of the fiber. For instance, the diameter and thicknesses are controlled by varying the diameters and lengths of feed orifices in a spinneret as shown in FIG. 2 or 3.

The following examples illustrate the present invention in detail. In the examples, parts are by weight.

The evaluation of light transmission efficiency was carried out in the following way.

Evaluation of light transmission loss

Figure 4:
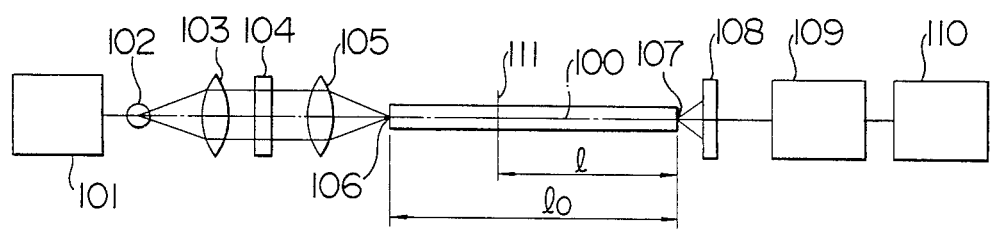
FIG. 4 is a schematic illustration of an assembly for measuring light transmission losses through optical fibers.

The transmission loss through the obtained optical fiber was measured with an instrument as shown in FIG. 4.

Rays from a halogen lamp 102 operated by a stabilized power supply 101 are turned into parallel rays through a lens 103, then made monochromatic through an interference filter 104, and converged to the focus of a lens 105 having the same numerical aperture as that of the optical fiber 100. The light incident upon the lightentrance end surface 106 of the fiber, said end surface being located at the focus, decays and leaves the fiber at the light-exit end surface 107. The light from the fiber is converted by a photodiode 108 having a sufficient surface area, into an electric current, which is then amplified by a current-voltage type of amplifier 109 and read as a voltage value on a voltmeter 110.

The transmission loss is measured according to the following procedures.

First, the optical fiber 100 is cut off to have a length $l_0$ and end surfaces perpendicular to the fiber axis. After both the ends have been finished to have smooth surfaces, the fiber 100 is fixed in the above described instrument so that neither the lightentrance end 106 nor the light-exit end 107 may move during the measurement. The room is darkened, and the reading of the voltmeter is designated as $I_l$. Then, the room lights are turned on, the light-exit end 107 is detached from the instrument, and the fiber 100 is cut at the point 111 remote by a length of l from this end 107. The resulting end of the fiber remaining in the instrument is finished, similarly to the first, to have a surface perpendicular to the fiber axis, and fixed, as a new light-exit end, in the instrument. During these operations, care is excricised so as not to move the light-entrance end 106 in order to maintain the incident light quantity constant. The room is darkened again, and the indicated value $I_2$ on the voltmeter is read. The light transmission loss α is calculated from the following formula:

$$\alpha = \frac{10}{l} \log\left(\frac{I_2}{I_1}\right) (dB/km)$$

wherein l: length (km) of optical fiber
$I_1$, $I_2$: light quantities (readings on voltmeter)
Measurement conditions in the present invention are as follows:

| | |
|---|---|
| Interference filter (principal wavelength) | 650–770 nm |
| $l_0$ (whole length of optical fiber) | 5–50 m |
| l (length of optical fiber cut away) | 4–20 m |
| D (diameter of bobbin) | 190 mm |

The bobbin herein is used for the purpose of compacting the instrument. An extra portion of the optical fiber is wound around the bobbin (not shown in the figure) so that the distance between the light-entrance end 106 and the light-exit end 107 may be about 1 m.

Example 1

Using both a reaction vessel equipped with a spiral ribbon type of stirrer and a volatile-matter separator comprising a twin-screw vent type of extruder, a monomer mixture composed of 100 parts of methyl methacrylate, 0.40 part of t-butyl mercaptan, and 0.00017 part of di-t-butyl peroxide was reacted by a continuous block polymerization method at a polymerization temperature of 155° C. for a mean residence time of 4.0 hr., then volatile matter was removed by means of the vent extruder while setting the vent section temperature at 260° C., the extrusion section temperature at 250° C., and the vent section vacuum at 4 mm Hg. The resulting polymer was fed as a core material through a gear pump kept at a temperature of 250° C. to a 250° C. composite-spinning head designed for core-cladding protective layer three-component fibers.

On the other hand, 100 parts of 2,2,3,3,3-pentafluoropropyl methacrylate prepared from methacryloyl chloride and 2,2,3,3,3-pentafluoropropanol, and 1 part of methacrylic acid were polymerized in the presence of azobisisobutyronitrile as a catalyst and a small amount of n-octyl mercaptan to give a cladding polymer of refractive index 1.417. This cladding polymer was fed by means of a screw melt extruder set at temperature of 220° C. to the composite-spinning head of 250° C. through a gear pump.

In addition, a polymer prepared by meltkneading a polycarbonate (Iupilon H-3000, supplied by Mitsubishi Gas Chemical, Inc.) with 3.0% of carbon black was fed as a protective layer material to the composite-spinning head of 250° C. by means of a screw melt extruder set at a temperature of 250° C. through a gear pump.

The simultaneously supplied molten polymers for core, cladding, and protective layers were discharged through a spinneret (orifice diameter 3 mmφ) at 250° C., cooled to solidify, and taken up at a speed of 3 mm/min. The spun fiber was stretched continuously to a draw ratio of 1.5:1 in a non-contact type of hot-air stretch oven at 160° C., and wound up to give an optical fiber of three-layer structure having an outer diameter of about 0.735 mm, core diameter of 470 μm, cladding thickness of 15 μm, and protective layer thickness of 250 μm. According to microscopic observation, the core, cladding and protective layers were disposed concentrically with high roundness and no bubble or foreign matter was found therein.

This optical fiber was measured for thermal shrinkage (caused by heat treatment of 130° C. ×24 hr) and light transmission losses (ambient temperature and 130° C.). Results thereof are shown in a table below.

EXAMPLES 2–9 AND COMPARATIVE EXAMPLE 1

Optical fibers were prepared in the same manner as in Example 1 except that dimensions of the layers were changed as shown in the table. Results of measuring the thermal shrinkages and light transmission losses are shown in the table.

It can be seen from the table that the light transmission loss measured at ambient temperature tends to become larger as the core is made finer, and that particularly in Comparative Example 1 the light transmission loss was markedly large. Referring to the cross-sectional shape of the optical fiber of Comparative Example 1, the core center deviated 20 μm from the fiber center and the fiber-combining loss was extremely large.

TABLE

| | Core diameter (μm) | Thickness of cladding (μm) | Thickness of protective layer (μm) | Outer diameter (μm) | S proc. S core + S cladding | Thermal shrinkage (%, 130° C. × 24 hr.) | Light transmission property (650 nm, dB/km) Ambient temp. | 130° C. |
|---|---|---|---|---|---|---|---|---|
| Example 1 | 470 | 15 | 250 | 1000 | 3 | 0.9 | 167 | 169 |
| Example 2 | 570 | 15 | 200 | 1000 | 1.78 | 2.5 | 161 | 189 |
| Example 3 | 720 | 15 | 125 | 1000 | 0.78 | 4.0 | 155 | 235 |
| Example 4 | 280 | 10 | 350 | 1000 | 10.1 | 0.6 | 180 | 181 |
| Example 5 | 140 | 5 | 425 | 1000 | 43.4 | 0.4 | 253 | 253 |
| Example 6 | 90 | 5 | 450 | 1000 | 99 | 0.4 | 310 | 310 |
| Example 7 | 320 | 15 | 200 | 750 | 3.59 | 0.9 | 173 | 174 |
| Example 8 | 140 | 5 | 175 | 500 | 10.1 | 0.8 | 260 | 260 |
| Example 9 | 920 | 4 | 36 | 1000 | 0.16 | 6.0 | 155 | 280 |
| Comparative Example 1 | 40 | 5 | 350 | 750 | 224 | 0.3 | 850 | 850 |

(Note)
$\frac{S \text{ proc.}}{S \text{ core} + S \text{ cladding}}$ : Ratio of cross-sectional area of protective layer to total cross-sectional area of core layer and cladding layer

Example 10

Similarly to Example 1, there was prepared an optical fiber of three-layer structure which had an outer diameter of 0.75 mm, core diameter of 500 μm, cladding thickness of 8 μm, and protective layer thickness of 117 μm.

This fiber was excellent in that light transmission loss through this fiber at ambient temperature was 165 dB/km for 650 nm. Moreover, this fiber was superior in that shrinkages thereof after 24 hours' heat treatments and light transmission losses through this fiber at these heat treatment temperatures were limited as shown in Table 1.

TABLE 1

| Heat treatment temperature °C. | Shrinkage % | Light transmission loss (dB/Km) |
|---|---|---|
| 120° C. | 0.3 | 165 |
| 90° C. × 95% RH | 0.4 | 169 |
| 130° C. | 0.6 | 168 |
| 100° C. boiling water | 0.9 | 170 |

This optical fiber was also subjected to the thermal shock test of repeating 10 times the operation in which the fiber was cooled in a thermostat at −40° C. for 2 hours and then heated at 120° C. for 2 hours. After this test, the light transmission loss was 165 dB/km, that is, no change was found in the loss.

Furthermore this fiber was immersed in a machine oil at 75° C. for 7 days and then measured for light transmission loss, which was 165 dB/km, indicating no change.

EXAMPLES 11–12 AND COMPARATIVE EXAMPLE 2

Optical fibers were prepared in the same manner as in Example 1 except that the melt extrusion temperatures were as shown in Table 2. Shrinkages, light transmission losses under heat treatment temperatures and results of thermal shock tests are also shown in Table 2.

TABLE 2

|  | Melt extrusion temperature (°C.) | Shrinkage (%) | | | | Light transmission loss (650 nm dB/km) | | Light transmission loss after thermal shock test (650 nm dB/km) |
|---|---|---|---|---|---|---|---|---|
|  |  | Dry heat treatment (1) | Dry heat treatment (2) | Wet heat treatment (3) | Wet heat treatment (4) | Ambient temp. | 130° C. |  |
| Example 10 | 250 | 0.3 | 0.6 | 0.4 | 0.9 | 165 | 168 | 165 |
| Example 11 | 240 | 1.3 | 3.5 | 2.5 | 4.4 | 155 | 226 | 245 |
| Example 12 | 260 | 0.2 | 0.4 | 0.3 | 0.5 | 190 | 190 | 190 |
| Comparative Example 2 | 230 | 5.5 | 8.0 | 6.5 | 10.0 | 155 | 754 | 1200 |

Notes:
Dry heat treatment (1) ... 120° C., 24 hr
Dry heat treatment (2) ... 130° C., 24 hr
Wet heat treatment (3) ... 90° C., 95% RH
Wet heat treatment (4) ... in 100° C. boiling water

EXAMPLE 13

Using both a reaction vessel equipped with a spiral ribbon type of stirrer and a volatile-matter separator comprising a twin-screw vent type of extruder, a monomer mixture composed of 100 parts of methyl methacrylate, 0.40 part of t-butyl mercaptan, and 0.0017 part of di-t-butyl peroxide was reacted by a continuous block polymerization method at a polymerization temperature of 155° C. for a mean residence time of 4.0 hr to prepare a polymethyl methacrylate having a melt flow rate (FR, 240° C., 5.0 kg load) of 7, from which volatile matter was then removed by means of the vent extruder while setting the vent section temperature at 260° C., the extrusion section temperature at 250° C., and the vent section vacuum at 4 mm Hg. The resulting polymer was fed as a core material through a gear pump kept at a temperature of 240° C. to a 240° C. composite-spinning head designed for core-cladding protective layer three-component fibers.

On the other hand, 100 parts of 2,2,3,3,3-pentafluoropropyl methacrylate prepared from methacryloyl chloride and 2,2,3,3,3-pentafluoropropanol, and 1 part of methacrylic acid were polymerized in the presence of azobisisobutyronitrile as a catalyst and a small amount of n-octyl mercaptan to give a cladding polymer of refractive index 1.417. This cladding polymer was fed to the composite-spinning head of 250° C. by means of a screw melt extruder set at a temperature of 220° C. through a gear pump.

In addition, a polymer prepared by meltkneading a bisphenol A-derived polycarbonate having [η] and FR values as shown in the following table with 3.0% of carbon black was fed as a protective layer material to the composite-spinning head of 240° C. by means of a screw melt extruder set at a temperature of 250° C. through a gear pump.

The simultaneously supplied molten polymers for core, cladding, and protective layers were discharged through a spinneret (orifice diameter 3 mmφ) at 240° C., cooled to solidify, and taken up at a speed of 3 m/min. The spun fiber was stretched continuously to a draw ratio of 1.8:1 in a non-contact type of hot-air stretch oven at 160° C., and wound up to give an optical fiber of three-layer structure having an outer diameter of about 1.5 mm, core diameter of 984 μm, cladding thickness of 8 μm, and protective layer thickness of 250 μm. According to microscopic observation, the core, cladding, and protective layers were disposed concentrically with high roundness and no bubble or foreign matter was found therein.

This optical fiber was measured for thermal shrinkage (caused by heat treatment of 130° C.×24 hr) and light transmission loss (ambient temperature and 130° C.). Results thereof are shown in Table 3.

EXAMPLES 14-15 AND COMPARATIVE EXAMPLES 3-4

Optical fibers were prepared in the same manner as in Example 13 except that polycarbonates having [η] and FR values as shown in Table 3 were used for the protective layers. Results of measuring the thermal shrinkages and light transmission losses are shown in Table 3.

TABLE 3

|  | Polycarbonate | | Thermal shrinkage (%) 130° C. × 24 hr | Light transmission loss (650 nm. dB/km) | |
|---|---|---|---|---|---|
|  | [η] | FR |  | Ambient temp. | 130° C. |
| Example 13 | 0.48 | 18 | 0.5 | 160 | 160 |
| Example 14 | 0.56 | 13 | 0.4 | 180 | 180 |
| Example 15 | 0.65 | 8 | 0.3 | 200 | 200 |
| Comparative Example 3 | 0.75 | 2 | 0 | 1500 | — |
| Comparative Example 4 | 0.35 | 35 | 2.0 | 160 | 220 |

Notes:
[η]: in methylene chloride, 20° C., unit dl/g
FR: 240° C., load 5.0 kg, unit g/10 min.

EXAMPLE 16

An optical fiber was prepared in the same manner as in Example 13 except that the polycarbonate for the protective layer was changed to a poly-4-methylpentene-1 (TPX supplied by Mitsui-Toatsu Chemicals, Inc.) melt-kneaded with 3.0% of carbon black. The resulting fiber was of a three-layer structure having an outer diameter of about 1.5 mm, core diameter of 984 μm, claddding thickness of 8 μm, and protective layer thickness of 250 μm. According to microscopic observation, the core, cladding, and protective layers were disposed concentrically with high roundness and no bubble or foreign matter was found therein. The thermal shrinkage of this fiber was 0.7% in the case of 120° C.×48 hr. The transmission loss of 650-nm light through this fiber was 213 dB/km at ambient temperature and 224 dB/km at 120° C. Thus, this fiber was superior in heat resistance.

EXAMPLE 17

Using both a reaction vessel equipped with a spiral ribbon type of stirrer and a volatile-matter separator comprising a twin-screw vent type of extruder, a monomer mixture composed of 100 parts of methyl methacrylate, 0.40 part of t-butyl mercaptan, and 0.00017 part of di-t-butyl peroxide was reacted by a continuous block polymerization method at a polymerization temperature of 155° C. for a mean residence time of 4.0 hr, then volatile matter was removed by means of the vent extruder at a vent section temperature of 260° C., an extrusion section temperature of 250° C., and a vent section vacuum of 4 mm Hg. The resulting polymer was fed as a core material through a gear pump kept at a temperature of 250° C. to a 250° C. composite-spinning head designed for core-cladding-primary coating layer three-component fibers (flexural elastic modulus of the core material: $2 \times 10^4$ kg/cm$^2$).

On the other hand, 100 parts of 2,2,3,3,3-pentafluoropropyl methacrylate prepared from methacryloyl chloride and 2,2,3,3,3-pentafluoropropanol, and 1 part of methacrylic acid were polymerized in the presence of azobisisobutyronitrile as a catalyst and a small amount of n-octyl mercaptan to give a cladding polymer (5 FM) of refractive index 1.417. This cladding polymer was fed to the composite-spinning head of 250° C. by means of a screw melt extruder set at a temperature of 220° C. through a gear pump.

In addition, an ionomer ($\epsilon_1 = 2.5 \times 10^3$ kg/cm$^2$) melt-kneaded was fed as a primary coating polymer to the composite-spinning head of 250° C. by means of a screw melt extruder set at a temperature of 250° C. through a gear pump.

The simultaneously supplied molten polymers for the core, cladding, and protective layers were discharged through a spinneret (orifice diameter 3 mm$\phi$) at 250° C., cooled to solidify, taken up at a speed of 3 mm/min, and wound up to give a fiber having a core diameter of 740 $\mu$m, cladding thickness of 8 $\mu$m, and a primary coating thickness of 20 $\mu$m.

Then, this fiber was coated with a 6, 12 nylon ($\epsilon_2 = 1.8 \times 10^4$ kg/cm$^2$) as a secondary coating material by means of a cross-head die type of cable fabricator to make up an optical fiber having an outer diameter of 1.5 mm.

Core strain, flexural strength, and light transmission loss were evaluated on the optical fiber thus obtained. Results are shown in Table 4.

The resistance to repeated flexing was measured by repeating 180° flexing of the fiber over a mandrel having the same diameter as that of the fiber and counting the number of flexing times where the retention of light quantity became 50%.

EXAMPLES 18–29 AND COMPARATIVE EXAMPLES 5–7

Optical fibers similar to that of Example 1 were prepared except for using primary and secondary layer materials as shown in Table 1 in place of the ionomer and 6, 12 nylon, respectively.

The optical fibers thus obtained were respectively evaluated for resistance to repeated flexing and light transmission loss in the same manner as in Example 17. Results are shown in Table 4.

TABLE 4

| | Core material | Cladding material | Primary coating layer Material | $\epsilon_1$ ($10^4$ kg/cm$^2$) | $A_1$ ($10^{-4}$ cm$^2$) | $\epsilon_1 \times A_1$ | Thermal shrinkage (%) 100° C. × 1 hr |
|---|---|---|---|---|---|---|---|
| Example 17 | PMMA | 5FM | Ionomer | 0.25 | 4.8 | 1.2 | 15 |
| Example 18 | " | " | " | " | 34 | 8.5 | " |
| Example 19 | " | " | " | " | 89 | 22.3 | " |
| Example 20 | " | " | Poly-4-methylpentene-1 | 1.3 | 4.8 | 6.2 | 0.1 |
| Example 21 | " | " | " | " | 34 | 44.2 | " |
| Comparative Example 5 | " | " | " | " | 89 | 116 | " |
| Example 22 | " | " | Polyacetal | 2.7 | 4.8 | 13.0 | 0 |
| Example 23 | " | " | " | " | 34 | 92 | " |
| Comparative Example 6 | " | " | " | " | 89 | 240 | " |
| Example 24 | " | " | Polycarbonate | 2.4 | 4.8 | 6.2 | " |
| Example 25 | " | " | " | " | 34 | 44.2 | " |
| Comparative Example 7 | " | " | " | " | 89 | 116 | " |
| Example 26 | " | 3FM | Ionomer | 0.25 | 4.8 | 8.5 | 18 |
| Example 27 | " | α-Fluoroacrylate polymer | " | 0.25 | " | " | " |
| Example 28 | Polycarbonate | 5FM | " | " | " | " | " |
| Example 29 | Polystyrene | " | " | " | " | " | " |

| | Secondary coating layer Material | $\epsilon_2$ ($10^4$ kg/cm$^2$) | $A_2$ ($10^{-4}$ cm$^2$) | $\epsilon_2 \times A_2$ | Thermal shrinkage (%) 100° C. × 1 hr | Resistance to repeated flexing (number of times) | Light transmission loss (dB/km) Room temp. | 100° C. |
|---|---|---|---|---|---|---|---|---|
| Example 17 | 6-12 nylon | 1.8 | 128 | 230 | 0.2 | 3500 | 160 | 165 |
| Example 18 | " | " | 98 | 176 | " | 4000 | 160 | 167 |
| Example 19 | " | " | 44 | 79 | " | 4200 | 160 | 170 |
| Example 20 | Polyvinylidenefluoride | 1.7 | 128 | 218 | 0 | 2000 | 195 | 200 |
| Example 21 | " | " | 98 | 167 | " | 1000 | 250 | 250 |
| Comparative Example 5 | " | " | 44 | 75 | " | 100 | 530 | 530 |
| Example 22 | Poly-4-methylpentene-1 | 1.3 | 128 | 166 | 0.1 | 800 | 250 | 250 |
| Example 23 | " | " | 98 | 127 | " | 600 | 290 | 290 |
| Comparative Example 6 | " | " | 44 | 57 | " | 80 | 700 | 700 |
| Example 24 | HDPE | 0.8 | 128 | 102 | 1.5 | 900 | 190 | 190 |
| Example 25 | " | " | 98 | 78 | " | 700 | 300 | 300 |
| Comparative | " | " | 44 | 35 | " | 150 | 650 | 650 |

TABLE 4-continued

| | | | | | | | | |
|---|---|---|---|---|---|---|---|---|
| Example 7 | | | | | | | | |
| Example 26 | 6-12 Nylon | 1.8 | 128 | 230 | 0.2 | 4000 | 160 | 165 |
| Example 27 | " | " | " | " | " | 8000 | 160 | 160 |
| Example 28 | " | " | " | " | " | 5000 | 950 | 950 |
| Example 29 | " | " | " | " | " | 1500 | 200 | 350 |

EXAMPLE 30

The three-ply optical fiber obtained in Example 1, which was comprised of core, cladding, and protective layers, was fed to a cross-head coating applicator, where a commercial water-crosslinkable polyethylene (tradename: Linkron MF-700N, density 0.945, supplied by Mitsubishi Petrochemical Co., Ltd.) which had been dry-blended with a catalyst master batch was applied, as a coating layer material, around the fiber at a head temperature of 235° C., extrusion temperature of 175° C., and linear velocity of 50 mm/min to a coating thickness of 0.3 mm, giving an optical fiber cord (outer diameter 1.335 mm). The resulting cord was subjected to water-crosslinking treatment in boiling water at 100° C. for 3 hr. The obtained optical fiber cord was stripped of the water-crosslinked polyethylene and the polycarbonate coating layer so as not to damage the fiber portion, and the cladding portion was observed with a microscope. No problem was found in the cladding portion.

EXAMPLE 31

Using both a reaction vessel equipped with a spiral ribbon type of stirrer and a volatile-matter separator comprising a twin-screw vent type of extruder, a monomer mixture composed of 100 parts of methyl methacrylate, 0.40 part of t-butyl mercaptan, and 0.00017 part of di-t-butyl peroxide was reacted by a continuous block polymerization method at a polymerization temperature of 155° C. for a mean residence time of 4.0 hr, then volatile matter was removed by means of the vent extruder at a vent section temperature of 260° C., an extrusion section temperature of 250° C., and a vent section vacuum of 4 mm Hg. The resulting polymer was fed as a core material through a gear pump kept at a temperature of 250° C. to a 250° C. composite-spinning head designed for core-cladding protective layer three-component fibers.

On the other hand, a copolymer obtained from an equimolar monomer mixture of methyl α-fluoroacrylate and 2,2,3,3,3-pentafluoropropyl α-fluoroacrylate was fed as a cladding material to a composite-spinning head for core-cladding two-component fibers. In addition a commercial polycarbonate (tradename: Iupilon H-3000, supplied by Mitsubishi Gas Chemical Co., Inc.) was melted and fed as a protective layer material to the composite-spinning head for core-cladding-protective layer three-component fibers.

The simultaneously supplied molten polymers for core, cladding, and protective layers were discharged through a spinneret (orifice diameter 3 mmφ) at 250° C., cooled to solidify, and taken up at a speed of 3 mm/min. Further, the spun fiber was stretched continuously to a draw ratio of 1.5:1 in a non-contact type of hot-air stretch oven at 160° C., and wound up to give a three-ply optical fiber having an outer diameter of about 1.0 mm, core diameter of 920 μm, cladding thickness of 4 μm, and protective layer thickness of 36 μm. According to microscopic observation, the core, cladding, and protective layers were disposed concentrically with high roundness and no bubble or foreign matter was found therein.

The thermal shrinkage of the obtained three-ply optical fiber was 5.0% when it was heat-treated at 130° C. for 24 hr. The light transmission loss was 155 dB/km at ambient temperature and 250 dB/km at 130° C.

This optical fiber was fed to a cross-head coating applicator, where a commercial water-crosslinkable polyethylene (tradename: Linkron MF-700N, density 0.945, supplied by Mitsubishi Petrochemical Co., Ltd.) which had been dry-blended with a catalyst master batch and with a carbon black master batch was applied, as a coating layer material, around the fiber at a head temperature of 200° C., extrusion temperature of 175° C., and linear velocity of 50 mm/min to a coating thickness of 0.6 mm, giving an optical fiber cord (outer diameter 2.2 mm).

The resulting cord was subjected to water-crosslinking treatment in boiling water at 100° C. for 3 hr. The obtained optical fiber cord was stripped of the water-crosslinked polyethylene and the polycarbonate protective layer so as not to damage the fiber portion, and the cladding portion was observed with a microscope. No problem was found in the cladding portion.

The thermal shrinkage of the obtained four-ply optical fiber cord was 0.8% at 130° C.×24 hr and the light transmission loss was 155 dB/km at ambient temperature and 160 dB/km at 130° C. The resistance to repeated flexing was also as superior as 25,000 times.

INDUSTRIAL APPLICATION

The optical fiber of the present invention is highly reliable in that the thermal shrinkage of the core layer is depressed and the light transmission loss due to thermal shrinkage is limited when the fiber is used in a high temperature site such as the engine room of an automobile.

This fiber can be favorably applied not only to optical transmission in optical communication systems of up to hundreds of meters, but also to optical communication or as photosensor means under high temperature conditions as particularly in the engine rooms of vehicles such as automobiles, ships, and aircraft.

We claim:

1. A plastic optical fiber comprising a core layer, a cladding layer, and a protective layer as basic constitutional units, characterized in that the protective layer has a heat distortion temperature [HDT] of at least 120° C., a thickness of at least 10 μm, and a cross-sectional area of at least 0.07 times the sum of the cross-sectional areas of the core and cladding layers.

2. The plastic optical fiber of claim 1, wherein the cross-sectional area of the protective layer is from 0.07 to 100 times the sum of cross-sectional areas of the core and cladding layers.

3. The plastic optical fiber of claim 1, wherein the relation between the melt flow rate $[MFR]_3$ of the protective layer polymer and the melt flow rate $[MFR]_1$ of the core layer polymer is represented by $[MFR]_1 \leq [MFR]_3$, wherein both the melt flow rates are measured under the same conditions of test temperature 230° C. and test load 5 kg.

4. The plastic optical fiber of claim 1, wherein the relation between the melt flow rate $[MFR]_1$ of the core layer polymer and the melt flow rate $[MFR]_2$ of the cladding layer polymer is represented by $[MFR]_1 \leq [MFR]_2 \leq 40$ g/10 min, where both the melt flow rates are measured under the conditions of test temperature 230° C. and test load 5 kg.

5. The plastic optical fiber of claim 1, wherein a primary coating or primary and secondary coatings forming the protective layer comprise an ethylenic polymer, said polymer being water proof.

6. The plastic optical fiber of claim 1, wherein the thermal shrinkage of a secondary coating material forming the protective layer is up to 10% at 100° C.

7. The plastic optical fiber of claim 1, wherein the thermal shrinkage of a primary coating material forming the protective layer is up to 10% at 100° C.

8. The plastic optical fiber of claim 1, wherein the protective layer is constituted by a primary coating consisting of a material having a flexural elastic modulus $\epsilon_1$ (kg/cm$^2$) and a cross-sectional area $A_1$ (cm$^2$) and a secondary coating consisting of a material having a flexural elastic modulus $\epsilon_2$ (kg/cm$^2$) and a cross-sectional area $A_2$ (cm$^2$), and these materials of the primary and secondary coatings are organic polymers satisfying $$\epsilon_1 A_1 \leq \epsilon_2 A_2.$$

9. The plastic optical fiber of claim 1, wherein the protective layer consists of either a polymer comprised substantially of 4-methylpentene-1 units or a polycarbonate exhibiting an intrinsic viscosity (in methylene chloride, at 20° C.) of 0.4–0.8 dl/g.

10. The plastic optical fiber of claim 8, wherein the flexural elastic modulus $\epsilon_0$ (kg/cm$^2$) of the polymer forming the core, the flexural elastic modulus $\epsilon_1$ (kg/cm$^2$) of the polymer forming the primary coating, and the flexural elastic modulus $\epsilon_2$ (kg/cm$^2$) of the polymer forming the secondary coating satisfy the following conditions:

$$\epsilon_1 \leq \epsilon_2$$

$$1 \times 10^2 \leq \epsilon_1 \leq \epsilon_0$$

$$1 \times 10^2 \leq \epsilon_2 \leq 5 \times 10^4$$

11. The plastic optical fiber of claim 9, wherein the melt flow rate $[MFR]_1$ of the core layer polymer measured under the conditions of test temperature 230° C. and test load 5 kg and the melt flow rate $[MFR]_2$ of the cladding layer polymer measured under the same conditions satisfy the relation $$[MFR]_1 \leq [MFR]_2 \leq 40 \text{ g/10 min}$$

, and the protective layer consists of an organic polymer having a flexural elastic modulus of up to 5,000 kg/cm$^2$.

12. The plastic optical fiber of claim 1, wherein the thickness of the protective layer is from 10 to 250 μm.

13. The plastic optical fiber of claim 9, wherein the core layer consists of a transparent methacrylic polymer containing at least 70% by weight of methyl methacrylate units, and the cladding layer consists of a substantially transparent fluorine-containing polymer having a refractive index 0.01% lower than that of the core layer.

14. The plastic optical fiber of claim 9, wherein the polymer forming the cladding layer contains monomer units represented by the general formula:

wherein R represents a $C_1$–$C_5$ alkyl, fluorinated $C_1$–$C_5$ alkyl, or $C_3$–$C_6$ cycloalkyl group.

15. The plastic optical fiber of claim 1, the core-cladding structure of which is formed at a spinning temperature of 240°–270° C.

16. The plastic optical fiber of claim 1, the shrinkage of said fiber being not more than 5% when said fiber is subjected to wet heat treatment for 24 hours under the conditions of 90° C. and 95% RH.

17. The plastic optical fiber of claim 1, the shrinkage of said fiber being not more than 5% when said fiber is subjected to dry heat treatment at 120° C. for 24 hours.

18. The plastic optical fiber of claim 1, the shrinkage of said fiber being not more than 5%, when said fiber is subjected to dry heat treatment at 130° C. for 24 hours.

19. The plastic optical fiber of claim 1, the shrinkage of said fiber being not more than 5% when said fiber is subjected to wet heat treatment in boiling water at 100° C. for 24 hours.

20. A plastic optical fiber comprising a core layer, a cladding layer, and a protective layer as basic constitutional units, characterized in that a plastics coating layer having a silane-crosslinked structure is provided as an outer layer of the fiber, and that the protective layer has a heat distortion temperature [HDT] of at least 120° C., a thickness of at least 10 μm, and a cross-sectional area of at least 0.07 times the sum of cross-sectional areas of the core and cladding layers.

21. The plastic optical fiber of claim 20, wherein the relation between the melt flow rate $[MFR]_3$ of the protective layer polymer and the melt flow rate $[MFR]_1$ of the core layer polymer is represented by $[MFR]_1 \leq [MFR]_3$, where both the melt flow rates are measured under the same conditions of test temperature 230° C. and test load 5 kg.

22. The plastic optical fiber of claim 20, wherein the relation between the melt flow rate $[MFR]_1$ of the core layer polymer and the melt flow rate $[MFR]_2$ of the cladding layer polymer is represented by $[MFR]_1 \leq [MFR]_2 \leq 40$ g/10 min, where both the melt flow rates are measured under the conditions of test temperature 230° C. and test load 5 kg.

23. The plastic optical fiber of claim 20, wherein the protective layer is constituted by a primary coating consisting of a material having a flexural elastic modulus $\epsilon_1$ (kg/cm$^2$) and a cross-sectional area $A_1$ (cm$^2$) and a secondary coating consisting of a material having a flexural elastic modulus $\epsilon_2$ (kg/cm$^2$) and a cross-sectional area $A_2$ (cm$^2$), and these materials of the primary and secondary coatings are organic polymers satisfying $\epsilon_1 A_1 \leq \epsilon_2 A_2$.

24. The plastic optical fiber of claim 20, wherein the protective layer consists of either a polymer comprised mainly of 4-methylpentene-1 units or a polycarbonate exhibiting an intrinsic viscosity (in methylene chloride, at 20° C.) of 0.4–0.8 dl/g.

25. The plastic optical fiber of claim 24, wherein the flexural elastic modulus $\epsilon_0$ (kg/cm$^2$) of the polymer forming the core, the flexural elastic modulus $\epsilon_1$ (kg/cm$^2$) of the polymer forming the primary coating, and the flexural elastic modulus $\epsilon_2$ (kg/cm$^2$) of the polymer forming the secondary coating satisfy the following conditions:

$$\epsilon_1 \leq \epsilon_2$$

$$1 \times 10^2 \leq \epsilon_1 \leq \epsilon_0$$

$$1 \times 10^2 \leq \epsilon_2 \leq 5 \times 10^4.$$

26. The plastic optical fiber of claim 20, wherein the melt flow rate [MFR]$_1$ of the core layer polymer measured under the conditions of test temperature 230° C. and test load 5 kg and the melt flow rate [MFR]$_2$ of the cladding layer polymer measured under the same conditions satisfy the relation:

$$[MFR]_1 \leq [MFR]_2 \leq 40 \text{ g}/10 \text{ min}$$

, and the protective layer consists of an organic polymer having a flexural elastic modulus of up to 5,000 kg/cm$^2$.

27. The plastic optical fiber of claim 20, wherein the core layer consists of a transparent methacrylic polymer containing at least 70% by weight of methyl methacrylate units and the cladding layer consists of a substantially transparent fluorine-containing polymer having a refractive index 0.01% lower than that of the core layer.

28. The plastic optical fiber of claim 20, wherein the polymer forming the cladding layer contains monomer units represented by the general formula:

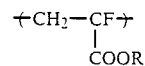

, wherein R represents a C$_1$–C$_5$ alkyl, fluorinated C$_1$–C$_5$ alkyl, or C$_3$–C$_6$ cycloalkyl group.

29. The plastic optical fiber of claim 27, wherein, in the plastic coating layer having a silane-crosslinked structure, the silane crosslinkage structure comprises Si—O—Si— and the plastic structure is comprised of an organic polymer selected from polyethylene, chlorinated polyethylene, ethylene-propylene copolymer, ethylene-vinyl acetate copolymer, ethylene-ethyl acrylate copolymer, and tetrafluoroethylene-propylene copolymer.

30. The plastic optical fiber of claim 27, wherein the protective layer is comprised of at least one organic material selected from the group consisting of polyolefins such as polyethylene, ethylenic copolymeric ionomer, polypropylene, and poly(4-methylpentene-1); halogen-containing polymers such as polyvinylidene fluoride, vinylidene fluoride copolymer, polytetrafluoro ethylene, tetrafluoro ethylene copolymer, polyvinyl chloride, and polyvinylidene chloride; and resins such as polyester, polyamide, polycarbonate, polyacetal, ABS resin, and SBR resin.

31. The plastic optical fiber of claim 20, the shrinkage of said fiber being not more than 5% when said fiber is subjected to dry heat treatment at 120? C. for 24 hours.

32. The plastic optical fiber of claim 25, the shrinkage of said fiber being not more than 5% when said fiber is subjected to dry heat treatment at 130? C. for 24 hours.

33. The plastic optical fiber of claim 25, the shrinkage of said fiber being not more than 5% when said fiber is subjected to wet heat treatment in boiling water at 100? C. for 24 hours.

* * * * *